United States Patent [19]

Hinschlager

[11] Patent Number: 5,312,303
[45] Date of Patent: May 17, 1994

[54] EASILY MOUNTED FULLY ENCLOSED CHAINGUARD

[75] Inventor: Robert A. Hinschlager, Mendon, Ohio

[73] Assignee: Huffy Corporation, Dayton, Ohio

[21] Appl. No.: 10,330

[22] Filed: Jan. 28, 1993

[51] Int. Cl.$^5$ .............................................. F16H 7/00
[52] U.S. Cl. ....................................... 474/144; 474/146
[58] Field of Search ................................. 474/144–147

[56] References Cited

U.S. PATENT DOCUMENTS

| | | | |
|---|---|---|---|
| 628,406 | 7/1899 | Griswold | 474/147 |
| 3,885,471 | 5/1975 | Morine et al. | 74/611 |
| 3,927,578 | 12/1975 | Mattila | 474/146 X |
| 4,908,008 | 3/1990 | Gorski | 474/146 |

*Primary Examiner*—Thuy M. Bui
*Attorney, Agent, or Firm*—Biebel & French

[57] ABSTRACT

A chainguard is disclosed for fully enclosing a bicycle chain on a bicycle having a front sprocket and a rear sprocket. The chainguard includes inside and outside covers extending from the front sprocket to the rear sprocket. The inside cover is formed as a hinged structure having top and bottom halves which may be pivoted together once the inside cover is in position extending around the bicycle crank and the rear axle. After the inside cover is in position, the outside cover may be moved into engagement with the inside cover whereby the top and bottom halves of the inside cover are secured together and the bicycle chain is fully enclosed.

20 Claims, 8 Drawing Sheets

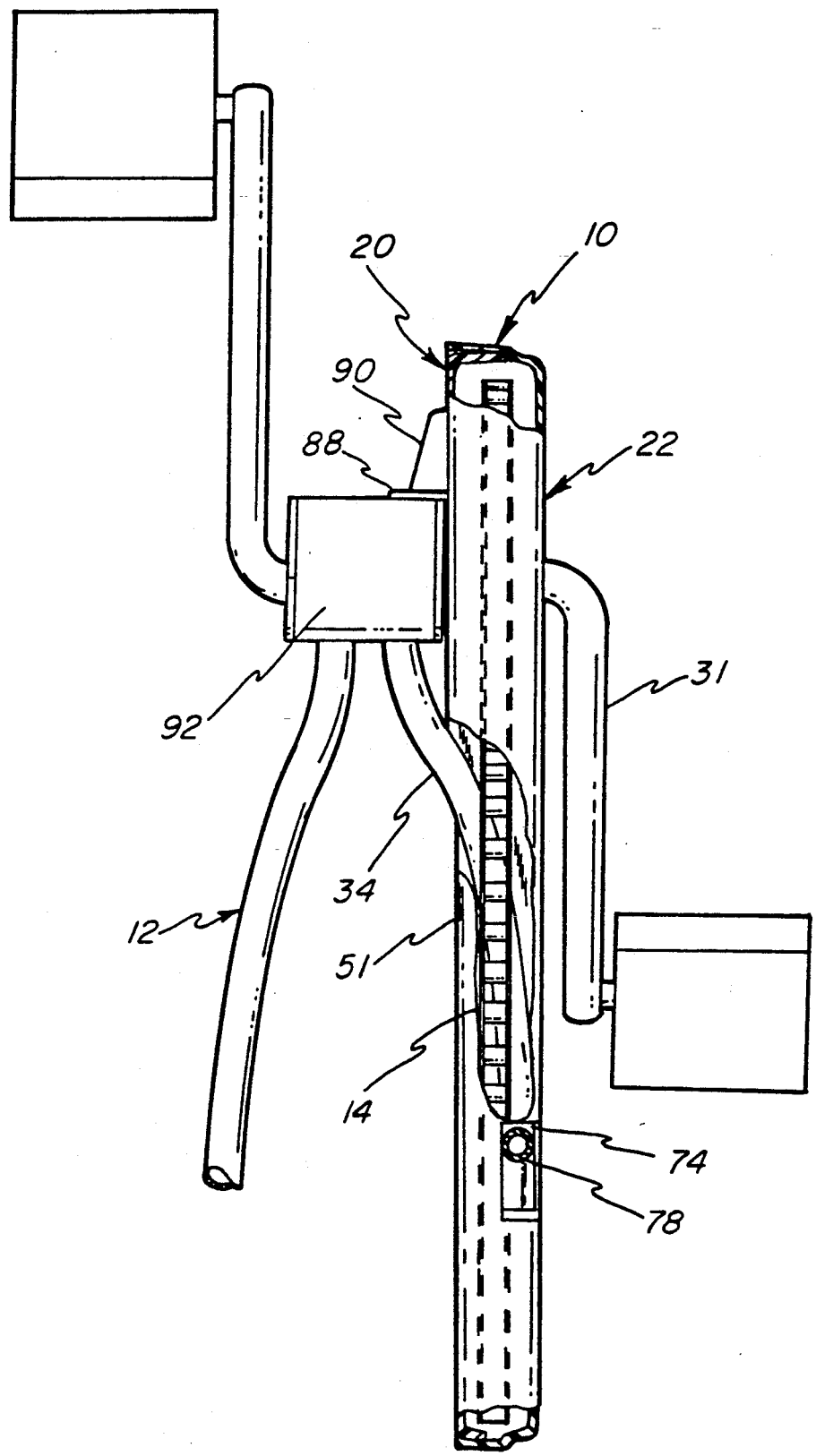
FIG·2

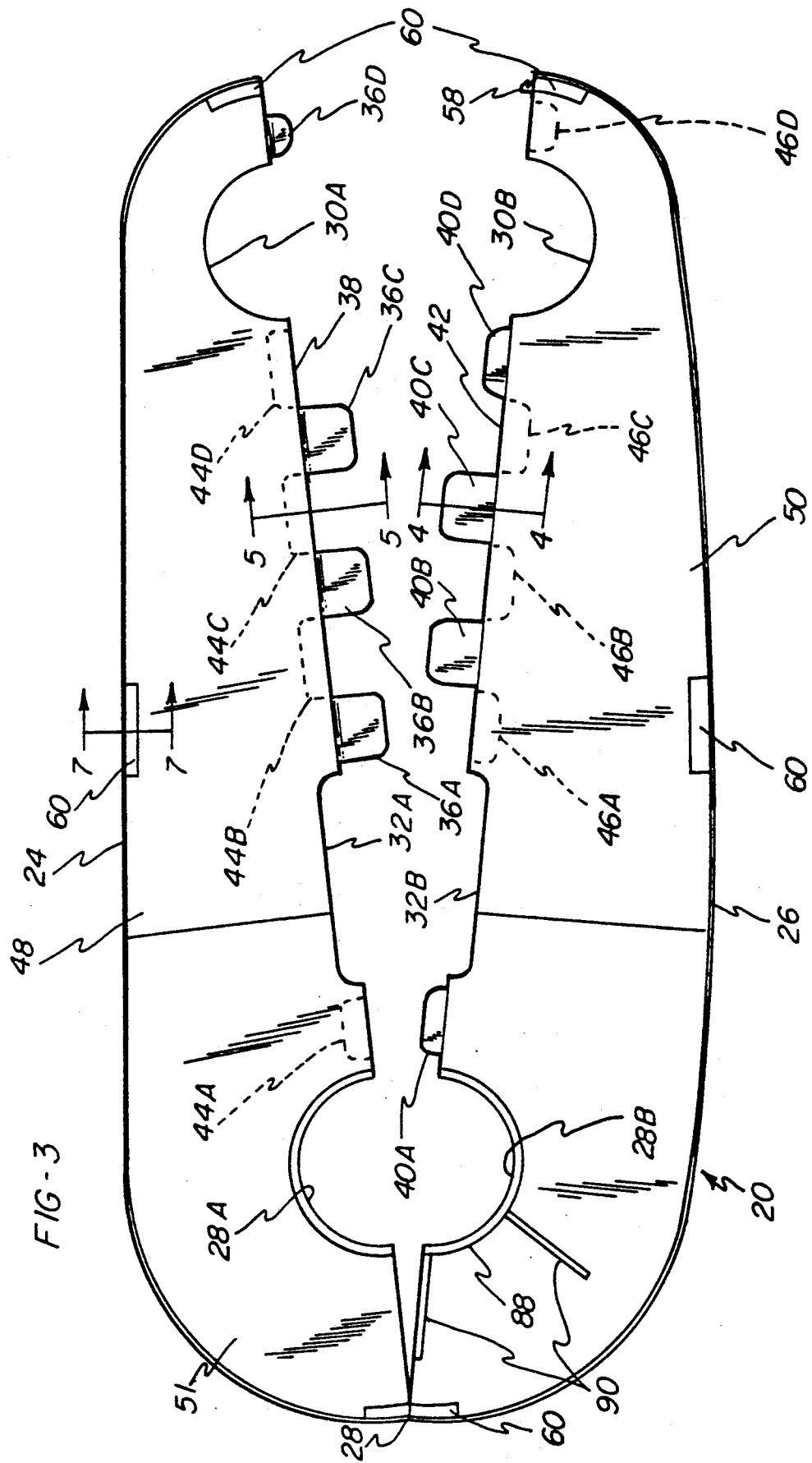

FIG·4
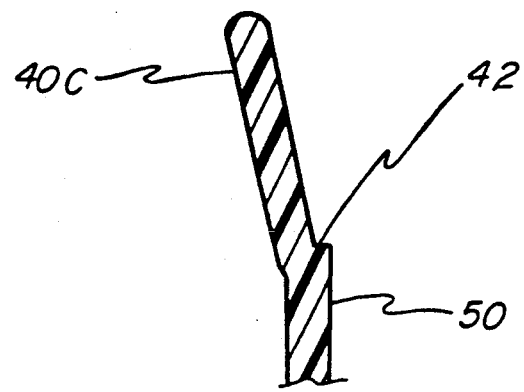
FIG·5
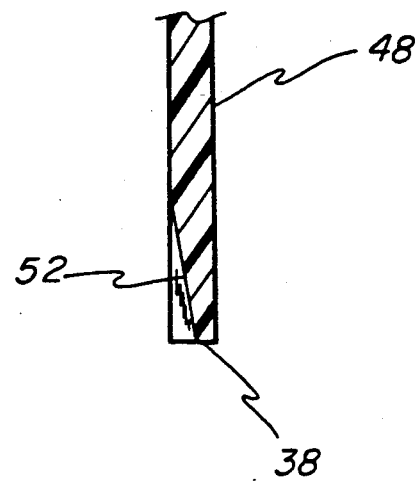

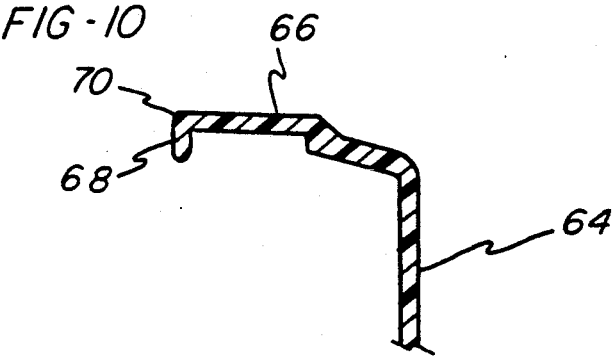
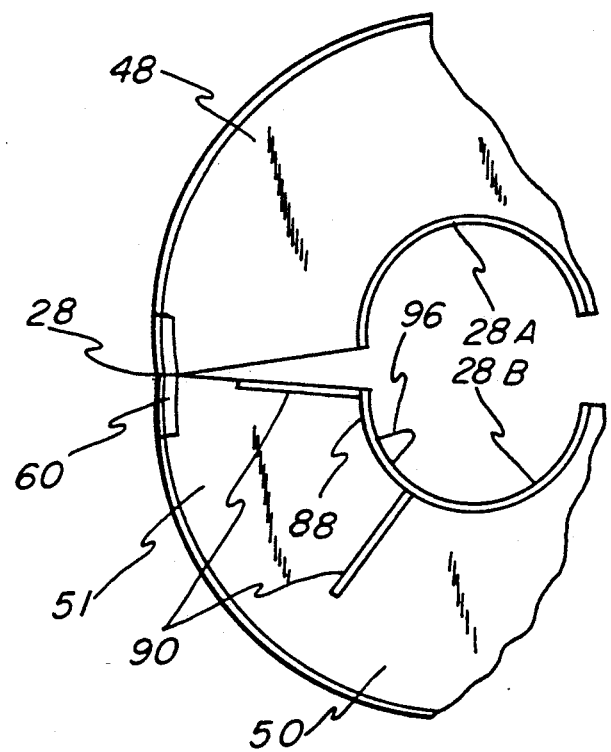

EASILY MOUNTED FULLY ENCLOSED CHAINGUARD

BACKGROUND OF THE INVENTION

The present invention relates to a bicycle chainguard, and more particularly, to a chainguard which may be quickly mounted to a bicycle and which completely encloses the bicycle chain.

Chainguards are well-known in the bicycle art for protecting a person from contact with the chain of the bicycle. Known bicycle chainguards have commonly extended along the length of the upper run of the chain and curve around the front portion of the chain and the front sprocket for the bicycle. Some chainguards cover the entire chain periphery and outboard surface. However, none of the known bicycle chainguards also cover the entire inboard surface as well. Thus, prior art chainguards have typically protected bicyclists against contact with certain portions of the chain while leaving other portions of the chain, as well as the rear sprocket, exposed. Such exposure of the chain can result in contact with the bicyclist, for example when the bicyclist is walking beside the bicycle, and can additionally result in exposure of the chain to dirt, dust and other debris which is thrown up by the wheels of the bicycle.

In addition, prior art bicycle chainguards have been attached to the bicycle by means of fasteners and specially designed brackets whereby the chainguard is held in a desired position relative to the chain and front sprocket. Thus, the installation of prior art chainguards has been labor intensive, and the added expense of providing fastener and bracket hardware for attaching the chainguards has added to the expense of bicycles.

Accordingly, there is a need for a bicycle chainguard which is capable of providing full enclosure for the bicycle chain, and which is easily mounted with a minimum of hardware. In addition, there is a need for a chainguard providing full enclosure of the chain while also being easily mounted to the bicycle either during or after installation of the bicycle drive system.

SUMMARY OF THE INVENTION

The present invention provides a chainguard for fully enclosing a bicycle chain on a bicycle having a front sprocket and a rear sprocket, the chainguard including an inside cover for positioning adjacent to the front sprocket and extending to a location adjacent to a back face of the rear sprocket, and an outside cover for positioning adjacent to the front sprocket and extending to a location adjacent to a front face of the rear sprocket, the outside cover engaging the inside cover such that the bicycle chain is fully enclosed from the front sprocket to the rear sprocket.

In another aspect of the invention, the inside cover is formed having a top half and a bottom half wherein the top and bottom halves are connected through a hinge connection. A snap connector is provided on one of the top and bottom halves opposite from the hinge connection for holding the top and bottom halves together.

In a further aspect of the invention, the inside cover and outside cover are each provided with engaging edges along which the outside and inside covers engage with each other. Further, the outside cover engages with the inside cover in such a manner as to ensure that the top and bottom halves of the inside cover remain secured in engagement with each other.

In a further aspect of the invention, a mounting foot is provided attached to the inside cover for attaching the chainguard to the crank housing of the bicycle. The mounting foot positions the front portion of the cover relative to the front sprocket to thereby hold the chainguard in position.

Therefore, it is an object of the present invention to provide a chainguard for fully enclosing a bicycle chain wherein the chainguard is provided with parts that are adapted to easily extend around the drive mechanism for a bicycle and which are conveniently snapped into place.

Other objects and advantages of the invention will be apparent from the following description, the accompanying drawings and the appended claims.

BRIEF DESCRIPTION OF THE DRAWINGS

FIG. 2 is a top plan view showing the chainguard in position on a bicycle wherein the top portion of the chainguard is partially cut away;

FIG. 3 is a side elevational view of the inside cover, showing an outer surface thereof;

FIG. 4 is a cross-sectional view taken along line 4—4 in FIG. 3;

FIG. 5 is a cross-sectional view taken along line 5—5 in FIG. 3;

FIG. 10 is a cross-sectional view taken along line 10—10 in FIG. 9; and

FIG. 11 is a side elevational view of the front end of the inside cover of an alternative embodiment of the present invention.

DETAILED DESCRIPTION OF THE PREFERRED EMBODIMENT

Figure 1:
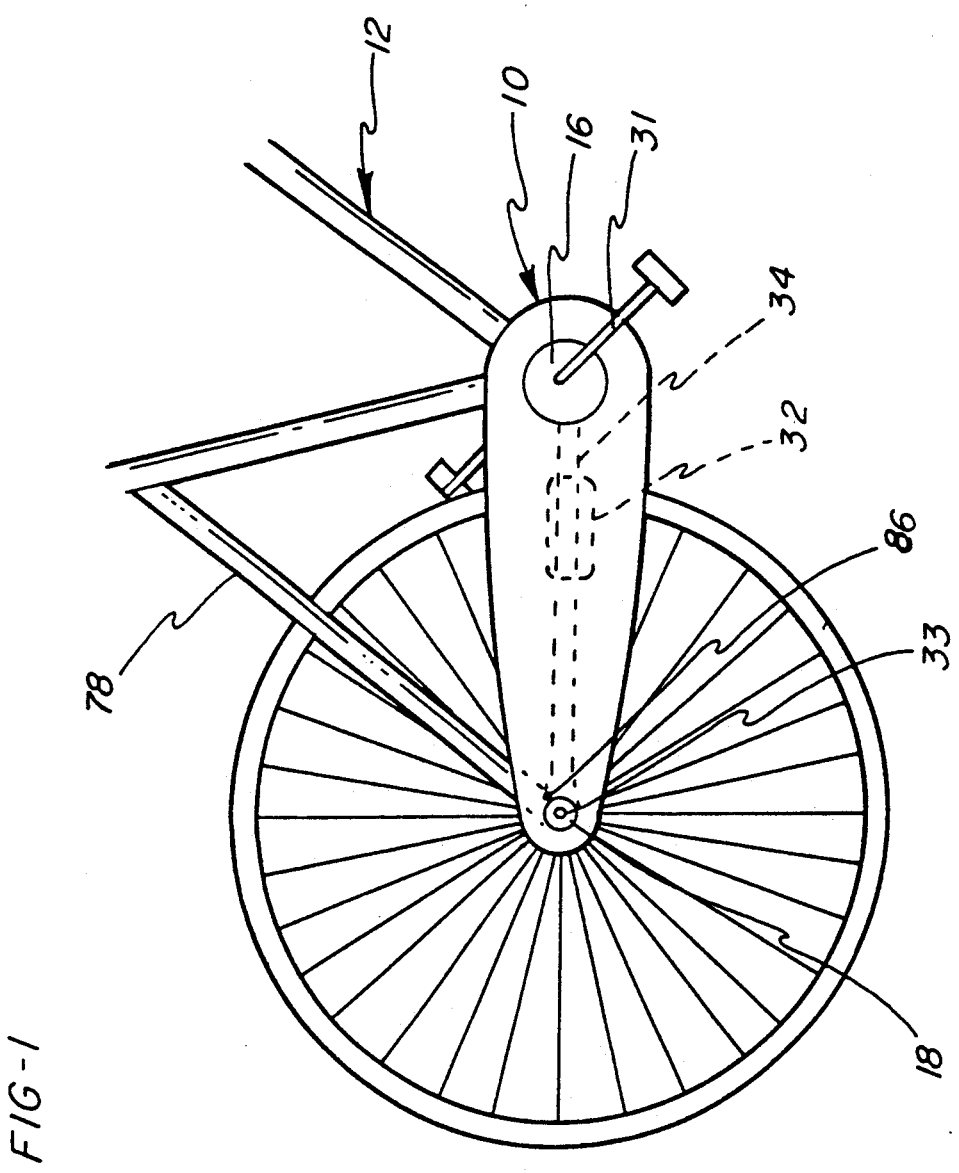
FIG. 1 is a side elevational view showing the chainguard of the present invention in position on a bicycle.

Referring to FIGS. 1 and 2, the chainguard 10 of the present invention is designed to be mounted to a conventional bicycle 12 for fully enclosing a drive chain 14 extending around a front sprocket 16 and rear sprocket 18 of the bicycle 12.

The chainguard 10 generally includes an inside cover 20 and an outside cover 22 wherein the inside and outside covers 20 and 22 are preferably formed of a molded plastic material and include cooperating engaging portions for holding the covers 20, 22 together to form a fully enclosed structure, as will be described further below.

Referring to FIG. 3, the inside cover 20 includes a top half 24 and a bottom half 26 which are joined by a hinge connection 28 at the front end of the inside cover 20. The top half 24, bottom half 26, and hinge connection 28 are preferably molded integrally with each other. The top half 24 includes a front top aperture half 28A and a rear top aperture half 30A. Similarly, the bottom half 26 includes a front bottom aperture half 28B and a rear bottom aperture half 30B wherein the aperture halves 28A and 28B are adapted to form a circular aperture for receiving a bicycle crank 31 therethrough and aperture halves 30A and 30B are adapted to form a circular aperture for receiving the axle 33 for the rear wheel of the bicycle therethrough.

The top and bottom cover halves 24, 26 also include complementary chain stay aperture halves 32A, 32B, respectively, for defining a chain stay aperture 32 (see FIG. 1) for permitting a bicycle chain stay 34 to extend into the chainguard 10, as shown in FIG. 2.

The top cover half 24 further includes a plurality of alignment tabs 36A-D for cooperating with an inner edge 42 of the lower cover half 26, and the lower cover half 26 includes a plurality of alignment tabs 40A-D for cooperating with an inner edge 38 of the upper cover half 24. In order to facilitate engagement of the tabs 36A-D and 40A-D with the respective edges 42 and 38, a plurality of slots 46A-D are provided along the edge 42 forming engagement surfaces for cooperating with the tabs 36A-D, and a similar plurality of slots 44A-D are provided along the edge 38 for cooperating with the tabs 40A-D.

As may be seen in FIG. 4, and illustrated by a typical tab 40C, the tabs extend inwardly from respective outer walls 48, 50 of the top and bottom cover halves 24, 26 wherein the outer walls 48, 50 define a back wall 51 for the inside cover 20. In addition, as shown in FIG. 5 and illustrated by a typical slot 46C, the slots are formed as ramp surfaces 52 inclined away from the outer walls 48, 50 in a direction away from the respective edges 38, 42.

As a result of the interengagement between he tabs 36A-D and 40A-D with the inclined ramp surfaces 52, a supporting structure is formed between the top and bottom cover halves 24, 26 whereby lateral movement of the edges 38, 42 transverse to a longitudinal axis of the chainguard 10 is prevented, thus facilitating alignment of the top and bottom cover halves 24, 27.

Figure 6:
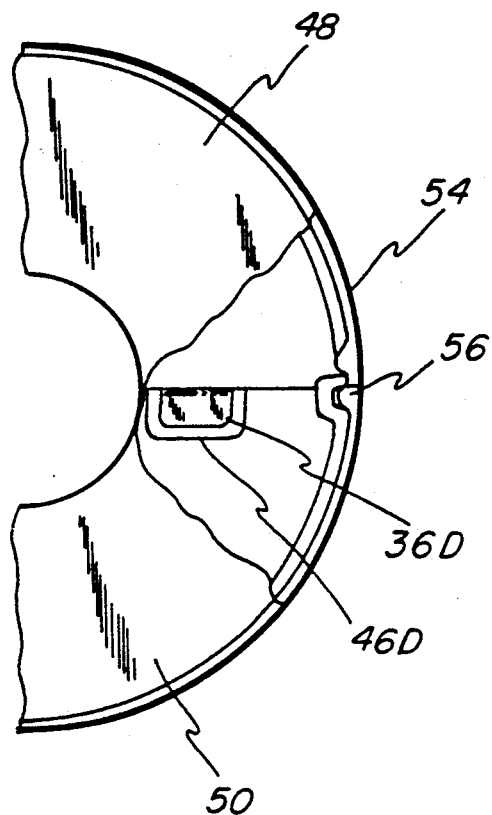
FIG. 6 is an enlarged partially cut-away view at the rear end of the inside cover showing the snap connection between the upper and lower halves.

Referring to FIGS. 3 and 6, means for holding the edges 38, 42 of the top and bottom cover halves 24, 26 in engagement with each other is shown in the form of a snap connection located along a rear edge 54 of the inside cover 20 opposite from the hinge connection 28. The snap connection includes a detent 56 formed on the top cover half 24 and a snap connector 58 formed on the bottom cover half 26. The snap connector 58 engages around the detent 56 when the cover halves 24, 26 are pivoted to a closed position in contact with each other such that the snap connection provides a temporary means for holding the top and bottom cover halves 24, 26 in a closed position for the inside cover 20.

It should be noted that other means may be provided for holding the top and bottom cover halves 24, 26 together, as long as the two halves 24, 26 are prevented from pivoting away from each other.

Figure 7:
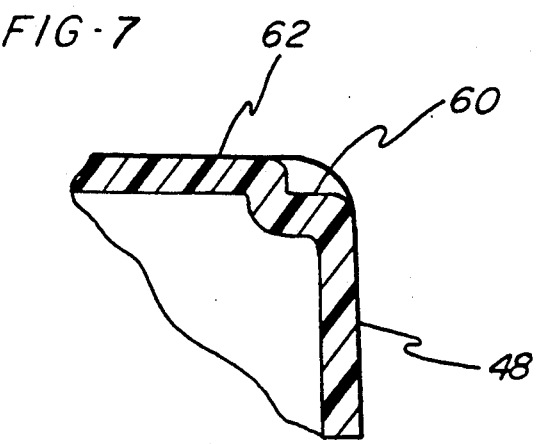
FIG. 7 is a cross-sectional view taken along line 7—7 in FIG. 3.

Referring to FIGS. 3 and 7, the inside cover 20 is further provided with a plurality of recesses 60 which are defined between the side walls 48, 50 and a peripheral back wall flange 62 extending perpendicular to the back wall 51. The slots 60 define an engagement area, as will be described further below.

Figure 9:
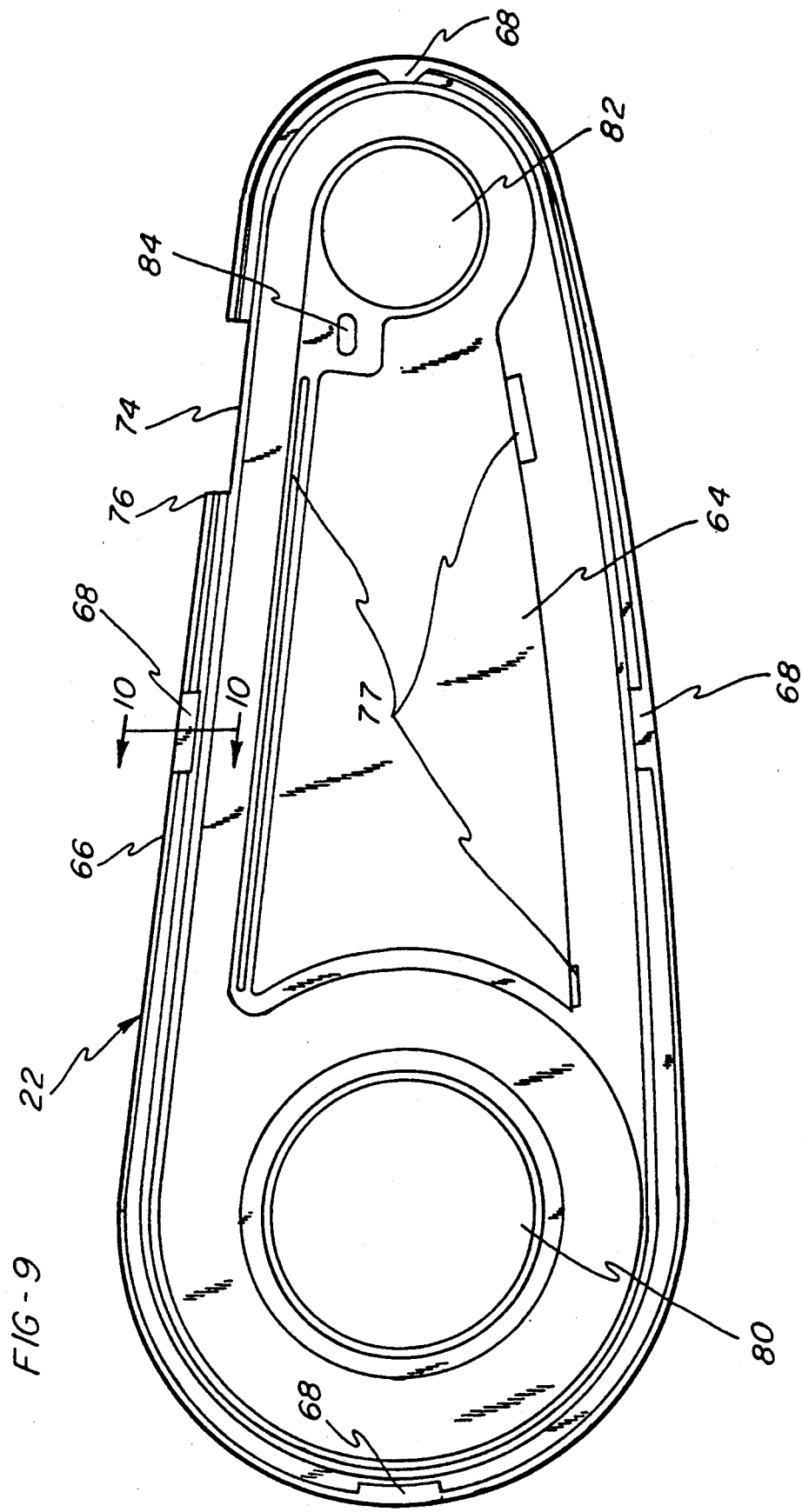
FIG. 9 is a side elevational view of the outside cover, showing an inner surface thereof.

Referring to FIGS. 9 and 10, the outside cover 22 includes a front wall 64 and a peripheral front wall flange 66 extending perpendicular to the front wall 64. A plurality of lips 68 are formed along an edge 70 of the front wall flange 66 and extend substantially parallel to the front wall 64. The lips 68 are adapted to engage within the plurality of recesses 60 formed in the inside cover 20 in order to hold the inside and outside covers 20, 22 in interlocked engagement with each other.

Figure 8:
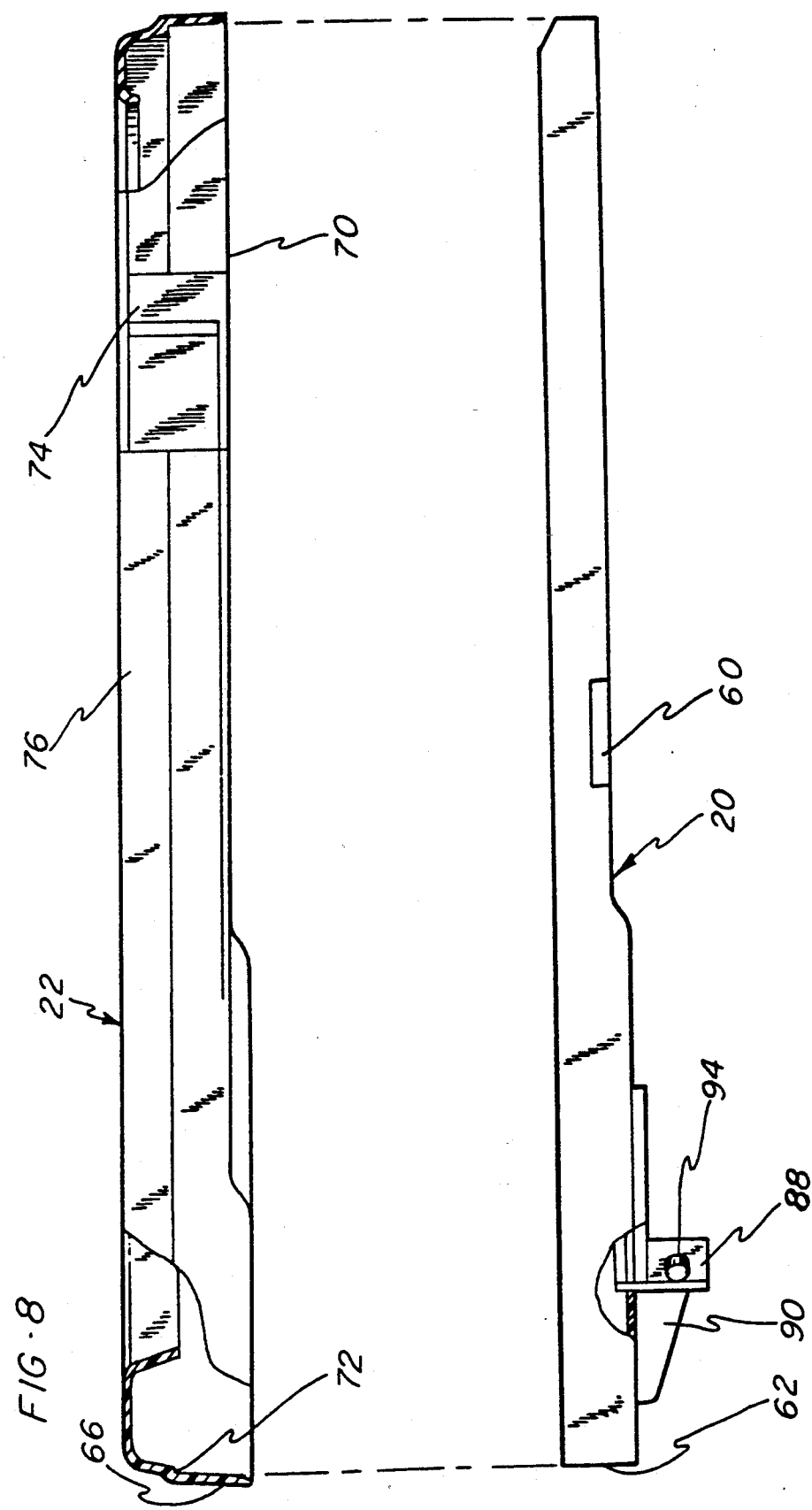
FIG. 8 is a top plan view of the inside and outside covers prior to the covers being mated together.

As may be seen in FIG. 8, the inside cover 20 is dimensioned to be received within the front wall flange 66 of the outside cover 22, and the outside cover 22 is provided with an abutment ledge 72 for contacting the edge of the back wall flange 62 when the inside and outside covers 20, 22 are positioned in engagement with each other.

Further, as may be seen in FIG. 9, the outside cover 22 is provided with a plurality of ribs 77 extending toward the inside cover 20 for stiffening the chainguard 10 and for ensuring that the covers 20, 22 remain in a predetermined position relative to each other.

It should be noted that the outside cover 22 includes a slot 74 defined along an upper edge 76 of the front wall flange 66, as seen in FIGS. 8 and 9. The slot 74 defines an aperture area in the upper surface of the chainguard 10 for permitting a seat stay 78 of the bicycle 12 to pass inside of the chainguard 10 when the chainguard is mounted in place, as may be seen in FIG. 1.

In addition, the outside cover 22 is provided with a front aperture 80 and a rear aperture 82 which are adapted to extend over and provide clearance for the bicycle crank and the rear axle, respectively. An additional aperture 84 is provided in the front wall 64 adjacent to the rear aperture 82 for receiving a fastener 86 to attach the rear portion of the chainguard 10 to a toe plate of the bicycle.

In order to support and position the front portion of the chainguard 10 relative to the front sprocket 16 of the bicycle, a foot 88 is provided extending from the back wall 51 of the inside cover 20 and supported by buttressing members 90. The foot 88 is adapted to extend out to a point adjacent to the crank housing 92 of the bicycle 12 and includes an aperture 94 for receiving a fastener which may be engaged in an aperture formed in the crank housing 92 to thereby positively position the front portion of the chainguard 10 relative to the front sprocket 16.

Alternatively, as shown in FIG. 11, the foot 88 may be provided with a pin molded integrally with the foot 88 and extending radially inwardly for engagement within an aperture formed in the crank housing 92. The pin 96 would further facilitate installation of the chainguard 10 in that it would eliminate the necessity of inserting and attaching a separate fastener during assembly of the chainguard onto the bicycle.

In mounting the present chainguard 10 to a bicycle 12, the inside cover 20 is first moved into position extending between the front and rear sprockets 16, 18 and with the top and bottom cover halves 24, 26 pivoted away from each other. With the inside cover 20 thus positioned, the top and bottom cover halves 24, 26 are pivoted toward and into engagement with each other with the front aperture halves 28A, 28B surrounding the bicycle crank housing 92, the rear aperture halves 30A, 30B surrounding the rear axle 33 and the chain stay aperture 32 surrounding the chain stay 34. In addition, the snap connector 58 is engaged with the detent 56 to hold the cover halves 24, 26 in engagement with each other until the outside cover 22 is moved into position.

The outside cover 22 is then moved into position in engagement with the inside cover 20 with the front wall flange 66 surrounding the back wall flange 62. When the outside cover 22 is properly positioned relative to the inside cover 20, the lips 68 will move down into position within the recesses 60 to securely hold the two covers 20, 22 in position relative to each other. Further, as a result of the front wall flange 66 of the outside cover 22 surrounding the back wall flange 62 of the inside cover 20, the cover halves 24, 26 are secured against pivotal movement relative to each other, such that the inside cover 20 is not dependent upon the snap connection 56, 58 for ensuring that the cover halves 24, 26 remain together.

In addition, the front portion of the chainguard 10 is attached to the crank housing 92 in the manner described above, and the rear portion of the chainguard 10 is attached to the toe plate of the bicycle 12 with the fastener 86.

From the above description, it should be apparent that the present chainguard 10 provides increased protection for a person using the bicycle 12 in that the chain 14 is fully enclosed preventing contact with the chain 14 at all points of its travel.

Further, the present chainguard 10 is easily mounted to a bicycle and the pivoted construction of the inside cover facilitates placement of the cover on the bicycle while also providing the fully enclosed structure described above.

While the forms of apparatus herein described constitute preferred embodiments of the invention, it is to be understood that this invention is not limited to these precise forms of apparatus, and that changes may be made therein without departing from the scope of the invention, which is defined in the appended claims.

What is claimed is:

1. A chainguard for fully enclosing a bicycle chain on a bicycle having a front sprocket and a rear sprocket, said chainguard comprising:
    an inside cover having a top half and a bottom half for positioning adjacent to the front sprocket, said top half and bottom half extending from the front sprocket to a location adjacent to a back face of the rear sprocket and being movable toward each other to surround a crank housing adjacent to the front sprocket; and
    an outside cover for positioning adjacent to the front sprocket and extending to a location adjacent to a front face of the rear sprocket, said outside cover being movable into engagement with said top and bottom halves of said inside cover such that the bicycle chain is fully enclosed from the front sprocket to the rear sprocket.

2. The chainguard of claim 1 wherein said inside cover includes edge portions and said outside cover includes edge portions, said edge portions of said outside cover cooperating with said edge portions of said inside cover to hold said top and bottom cover halves in association with each other surrounding said crank housing.

3. The chainguard of claim 1 including a hinge connection defining a pivot axis between said top and bottom halves wherein said pivot axis extends parallel to a rotational axis for the front sprocket.

4. The chainguard of claim 3 including a snap connector on one of said top and bottom halves opposite from said hinge connection for holding said top and bottom halves together.

5. The chainguard of claim 1 wherein said top and bottom halves each include inner engaging edges and said outside cover includes outer engaging edges, said outside cover being movable relative to said inside cover such that said outer engaging edges surround said inner engaging edges to secure said top and bottom halves in position relative to each other.

6. The chainguard of claim 1 wherein said inside cover includes a back wall and a peripheral back wall flange extending perpendicular to said back wall, said inside cover including a recess located at said back wall, and said outside cover includes a front wall, a peripheral front wall flange extending perpendicular to said front wall and a lip extending substantially parallel to said front wall for engaging within said recess to hold said outside cover in engagement with said inside cover.

7. The chainguard of claim 1 including an elongated connector formed integrally with said inside cover for engaging within an aperture in a crank housing of the bicycle to secure said chainguard to the bicycle.

8. The chainguard of claim 1 wherein said inside cover includes a back wall, and including a foot extending from said back wall for positioning adjacent to a crank housing of the bicycle, said foot including an aperture for receiving a fastener to fasten said chainguard to the bicycle.

9. The chainguard of claim 8 including means for securing said chainguard to a frame member of the bicycle adjacent to the rear sprocket.

10. The chainguard of claim 1 including means defining an aperture in an upper surface of said chainguard for receiving a seat stay of the bicycle therethrough.

11. The chainguard of claim 1 including means defining an aperture in said inside cover for receiving a chain stay of the bicycle therethrough.

12. A chainguard for fully enclosing a bicycle chain, said chainguard comprising:
    a top cover half;
    a bottom cover half; and
    an outside cover wherein said top and bottom cover halves are movable toward each other to form an inside cover surrounding a crank housing supporting a crank for actuating the bicycle chain, and said outside cover is movable relative to said inside cover into engagement with said inside cover to secure said top cover half and said bottom cover half in position relative to each other.

13. The chainguard of claim 12 including a hinge connecting said top and bottom cover halves together.

14. The chainguard of claim 13 including a connector located on said inside cover opposite from said hinge for holding said top and bottom cover halves together prior to being secured in position by said front cover.

15. The chainguard of claim 12 including alignment tabs formed on said top and bottom cover halves for engaging with opposing surfaces on said bottom and top cover halves, respectively, whereby said top and bottom cover halves are aligned with each other during said movement toward each other.

16. The chainguard of claim 12 including a recess formed in said inside cover and a lip formed on said outside cover wherein said lip engages said recess to hold said outside cover in engagement with said inside cover.

17. The chainguard of claim 12 wherein said inside cover is adapted to be positioned adjacent to an inside face of a sprocket supported by said crank, and said outside cover is adapted to be positioned adjacent to an outside face of said sprocket.

18. A chainguard for fully enclosing a bicycle chain on a bicycle having a front sprocket and a rear sprocket, said chainguard comprising:

a front wall for extending in front of and adjacent to the front and rear sprockets, said front wall including means defining front and rear apertures for extending around a crank and a rear hub, respectively, of the bicycle;

a back wall for extending behind and adjacent to the front and rear sprockets, said back wall including means defining front and rear apertures for extending around said crank and said rear hub, respectively, of the bicycle;

edges extending around the periphery of said front and back walls to connect said front and back walls together and to fully enclose the bicycle chain and the front and rear sprockets;

said back wall comprising a top half and a bottom half connected for pivotal movement relative to each other at a hinge located adjacent to a front edge of said back wall, said top and bottom halves defining upper and lower portions, respectively, of said front and rear apertures for said back wall; and wherein said edges include inner edges formed integrally with said back wall and outer edges formed integrally with said front wall for engaging said inner edges in interlocking engagement whereby said top and bottom halves of said back wall are secured in position relative to each other.

19. The chainguard of claim 18 including means defining an aperture in an upper surface of said chainguard for receiving a seat stay of the bicycle therethrough.

20. The chainguard of claim 18 including means defining an aperture in said inside cover for receiving a chain stay of the bicycle therethrough.

* * * * *